United States Patent
Poulsen

[11] 3,908,632
[45] Sept. 30, 1975

[54] SOLAR HEAT ABSORBING SYSTEM

[75] Inventor: Harold W. Poulsen, Arlington Heights, Ill.

[73] Assignee: Universal Oil Products Company, Des Plaines, Ill.

[22] Filed: June 24, 1974

[21] Appl. No.: 482,121

[52] U.S. Cl. ............... 126/271; 34/57 A; 165/104; 165/107; 237/1 A
[51] Int. Cl.² ........................................... F24J 3/02
[58] Field of Search ............ 126/270, 271; 237/1 A; 432/15.58; 34/57 R, 57 A, 57 B, 102; 165/104, 107

[56] References Cited
UNITED STATES PATENTS
| | | | |
|---|---|---|---|
| 2,493,911 | 1/1950 | Brandt | 34/57 A |
| 3,107,052 | 10/1963 | Garrison | 126/271 |

FOREIGN PATENTS OR APPLICATIONS
| | | | |
|---|---|---|---|
| 1,176,174 | 4/1959 | France | 126/271 |

*Primary Examiner*—Carroll B. Dority, Jr.
*Assistant Examiner*—James C. Yeung
*Attorney, Agent, or Firm*—James R. Hoatson, Jr.; Philip T. Liggett; William H. Page, II

[57] ABSTRACT

Improved solar heat recovery is provided through the use of a system which embodies passing air or other gaseous stream with entrained black body particles from a solar heating zone to a particle separation zone such that a heated particle stream can be passed to a heat exchange zone to impart heat to water or other heat exchange medium. The resultant cooled particles are subsequently remixed with the gaseous stream being separately discharged from the particle separation zone such that a recombined stream is recirculated to the solar heating zone to provide a continuous operation.

9 Claims, 1 Drawing Figure

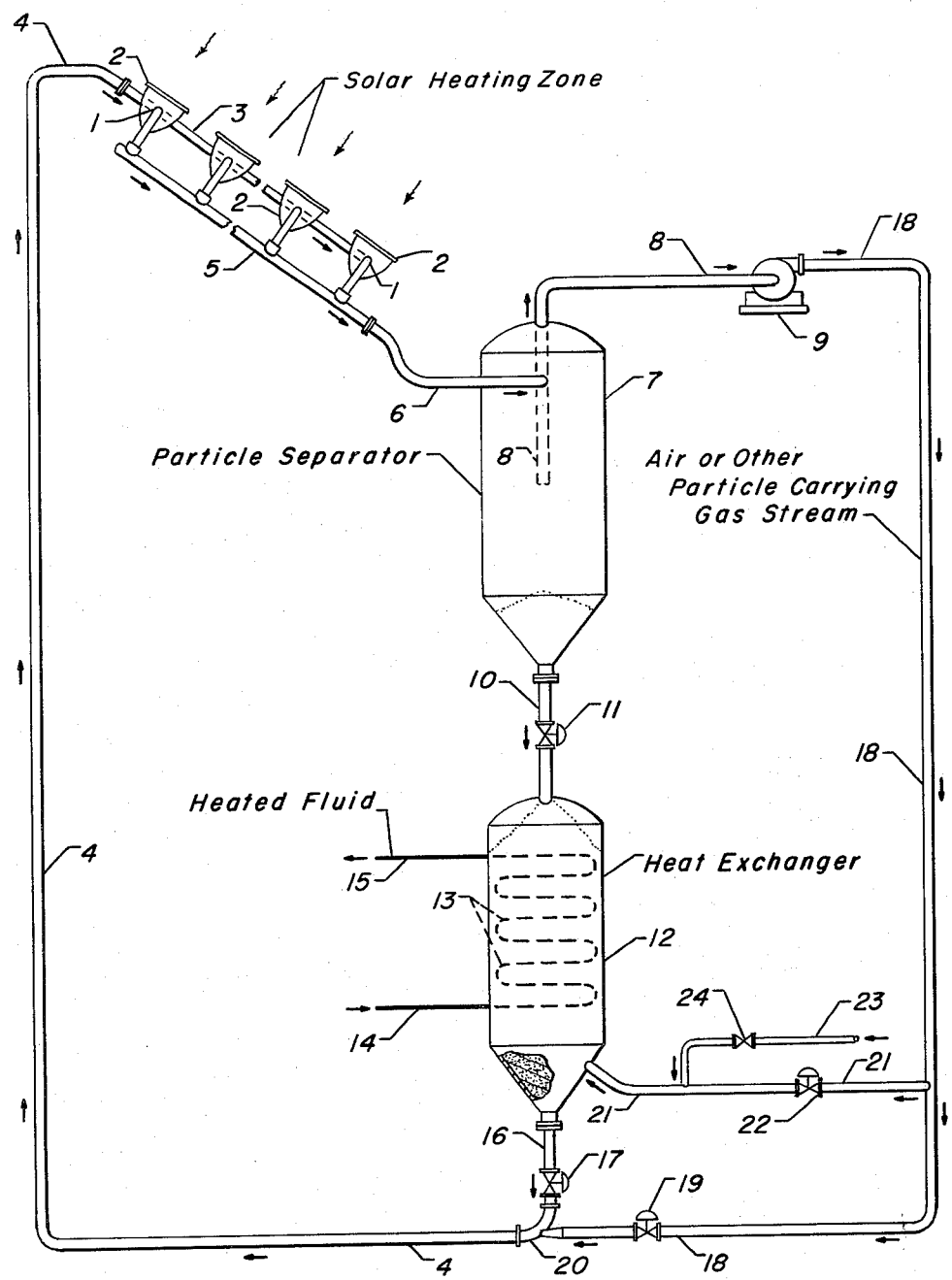

SOLAR HEAT ABSORBING SYSTEM

The present application is directed to the recovery of solar heat in a moved system which provides for the use of heat absorbing black body particles in a gaseous stream.

More particularly, the present application is directed to a solar heating system and an operation where the heat absorbing black body particles are separated from the carrying stream prior to their being transferred to a heat exchange zone so as to reduce the volume of material being handled in such zone and resulting cooled particles are subsequently recombined with the carrying gas ahead of the solar heating zone so as to maintain a continuous operation with a more efficient heat exchange arrangement.

BACKGROUND OF THE INVENTION

It is recognized that clear gaseous streams will have low heat absorption and low emissivity characteristics and are not efficient for retaining the infrared heat which can be imparted to a moving fluid stream in a solar energy heat recovery system. Although air may have a heat capacity about equal to many black body materials on a BTU/1b basis, it is also realized that the entrained black body materials will have the far greater weight in a fluidized stream and will thus absorb much more heat. For example, the heat capacity ($C_p$) of air at 100° F. is about 0.25 BTU/lb, at one atmosphere of pressure, while coke or graphite would have a heat capacity in the range of about 0.20 to 0.39 BTU/lb. However, in an operation where fluidized black particles are carried in a gas stream through solar heating tubes, the weight of the particulates may be in a range of from about 3 pounds to 20 pounds or more per cubic foot, depending upon the weight of the particular black body material being used and whether there is a "light phase" or "heavy phase" density to the aerated flowing stream, while the weight of the air, or other carrying gas, would be negligible. In any event, it will be obvious that the heat absorbed by the gaseous portion of the stream will be negligible as compared to the heat which will be absorbed into the particulates.

It has been previously suggested and known to make use of black body particles in heat absorbing tubing systems for solar heat recovery as well as in a heat absorbing liquid stream; however, it is believed novel to provide a system where there is rapid separation of entrained black body particles from a carrying gas such that a stream of essentially the higher temperature particles only can be used in a heat exchanger means to provide a more efficient solar heat recovery system. With a heat exchange means to handle only the reduced volumetric flow of the black body particulates, there should be a reduced capacity heat exchanger, as compared to means for handling a total stream, and an accompanying lower first cost in such equipment.

Typically, water or other liquids have been used to collect heat in the solar "windows" or tubing and the water then passed to suitable storage or heat exchange zones such that useful heat may be obtained from the solar energy. However, in northern climates with both daytime and night-time freezing conditions, it can be of particular advantage to have a heat collection system free of any problems with water or other liquids to preclude freezing of outside valves and lines. A gaseous system is also of advantage in permitting the use of blowers instead of pumps and their attendant problems.

SUMMARY OF THE INVENTION

Thus, it may be considered a principal object of the present invention to provide a solar heat collecting system providing for an air or other gas stream entrainment of black body heat absorbing particles in a solar heating zone and the separation of the heated particles from the lesser heated fluid medium for transfer to a heat exchange-heat recovery zone.

It is also an object of the present invention to provide for the remixing of the particles and the carrying gas after the particles have been passed through a heat exchange zone such that the particles can be rapidly transferred back to the solar heating zone to provide an efficient continuously operating system.

It is a further object of the present invention to provide means for aerating the particle rich stream within the heat exchange zone such that there will be a good heat transfer relationship and enhanced contact of hot particles with the heat exchange surfaces within the heat exchange zone. The aerating fluid may comprise a portion of the particle free stream or, if desired, a separately supplied fluidizing medium may be introduced into the heat exchange zone for the aeration and for the enhanced contact with the heat exchange surfaces.

Briefly, the present invention provides an improved method for effecting the recovery of solar heat in a manner which comprises (a) passing a gaseous carrying stream with entrained black body particles to a heating zone for exposure to solar radiant energy, (b) passing said stream with resulting heated particles from said heating zone to a particle separation zone and effecting a separation to provide a particle stream and a primarily particle free stream, (c) passing the particle stream from the latter zone to a heat exchange zone and recovering heat therefrom, (d) subsequently passing the resulting cooled particle stream to a mixing zone and therein combining it with the particle free stream obtained from said separation zone, and (e) then recirculating the recombined particle containing stream to said heating zone for reexposure to the solar energy.

It is not intended to limit the present system to the use of any one gaseous carrying medium although air may well be used to advantage to effect the desired type of operation. Also, nitrogen, carbon dioxide or other suitable, generally inert, gaseous medium may well be utilized to effect the entrainment and movement of the black body particles in a fluidized manner from one zone or section of the system to the other.

With respect to black body particles, various types of materials may well be utilized in the present system, as for example carbonaceous materials, which may comprise carbon black, channel black, oil furnace black, lamp black and the like, or even crushed natural materials such as coal, coke, charcoal, etc. There also may be utilized pyropolymeric conductive organic-refractory oxide particles which are formed by the deposition of a pyropolymer on the surface of a base material at a relatively high temperature in the range of 400° to 750° C. For example, organic substances such as aliphatic hydrocarbons, cycloaliphatic hydrocarbons, aromatic hydrocarbons, aliphatic halogen derivatives, aliphatic oxygen derivatives, carbohydrates, etc., may be pyrolyzed over the surface of a subdivided refractory oxide material. The refractory oxide may be alumina in various forms, such as gamma-alumina and silica-alumina; however, various other refractory oxides may be used. This type of material is described in U.S. Pat. No. 3,651,386, issued Mar. 21, 1972. Certain of the carbonized refractory oxide materials may be of advantage over other black body materials by reason of greater surface area for exposure to the solar radiations.

Preferably, the black body particles will be non-packing and of a relatively uniform size such that the material may be readily entrained and separated from the carrying fluid stream. It is also of advantage to have particulates that will move in a descending gravity flow from a separator means as well as through the heat exchange zone. Actually, it may be of advantage to provide specially prepared black body particles which are of a generally spherical nature such that they will flow readily in a non-packing manner. In addition to the aforementioned carbonaceous materials it may be of advantage to utilize fine, small spherical beads from black body particles, where the particles are formed of dark colored glass or from various of the resin or plastic types of material.

Inasmuch as the infrared radiation from the solar energy in the heating zone will be primarily absorbed into the black body particles and very little heat retained by the generally transparent carrying stream, whether it be air, or other fluid medium, it is generally of advantage to effect the separation of the carrying fluid from the black body particles soon after the heating stream is passed from the solar zone such as to minimize heat transfer between the black body particles and the carrying medium. The type of separation zone may vary with the nature of the entrained particles; however, typically the combined stream may well be introduced into one or more stages of a centrifugal form of particle separator such that a substantially particle free gaseous stream will be discharged from the upper portion of the separator and separated particles withdrawn from the lower portion of the separator. Electrostatic precipitator means may also be used; however, such devices are quite costly as compared to mechanical centrifugal separator means and the efficiency of separation from the latter should be quite adequate for the present system.

In any event, the particle rich stream from the lower portion of the separator means will be discharged into a heat exchange zone such that the heat of the particles can be imparted to a suitable heat exchange medium which will then pass recovered heat along to a storage zone or directly to a zone of heat usage.

In a simplified form of system, there may be downward gravity flow of the separated heat particles through the heat exchange zone such that there is direct contact between the particles and the multiple heat exchange surfaces provided in the particular heat exchange apparatus. The resulting cooled particles may also be permitted to flow by gravity from the lower portion of the heat exchange zone to be passed to a suitable mixing zone for re-entrainment with the carrying fluid. Actually, there may be the direct intermixing between the separated carrying gas and the cooled particles at a zone directly below the heat exchange means by blowing the substantially particle-free carrying stream to the standpipe or outlet means below the heat exchanger means such that there is a direct intermixing of particles and the carrying medium. The mixture is then recycled back to the solar heating zone to pass through the various passageways or conduit means which permit solar radiation to reheat the black body particles being entrained in the combined stream.

In a modified form of system, as hereinbefore briefly noted, there may be the use of a part of the carrying gas to effect aeration within the heat exchange zone such that the heated black body particles can effect a turbulent improved heat relationship with heat transfer passageway provided in the particular heat exchange apparatus.

DESCRIPTION OF THE DRAWING

The present invention may be further described and explained by reference to the accompanying diagrammatic drawing and the following description thereof.

In the present drawing, there is indicated diagrammatically the utilization of a plurality of tubular members 1 to provide a solar heating section where entrained black body particles may be exposed to solar energy and permit the absorption of infrared heat into the particles. The tubes 1 are also indicated as being encompassed by parabolic reflector members 2 such that there may be a concentration of radiant heat onto each of the tubes 1 and into the particulates being passed therethrough. There is further indicated the use of a fluid distributor header 3 receiving entrained black body particles from line 4 such that there may be a suitable distribution of the particles and the carrying stream into and through the plurality of conduits 1. For the collection of heated streams, there is indicated the utilization of a header means 5 along the other ends of the tubular members 1 and positioned to discharge a resulting elevated temperature particle stream by way of line 6 into a particle separator means 7 whereby the higher temperature particulates can be separated from the lower temperature gaseous carrying medium.

As shown by the drawing, the carrying medium will be withdrawn from the upper portion of the separator 7 by way of line 8 and blower means 9 while separated heated particles will fall to the lower end of the separator and be discharged by way of transfer conduit 10 and valve means 11 into the upper portion of the heat exchange 12. Preferably, where the heated particles can flow by gravity, there will be the continuous downward movement of the particles through the height of the heat exchange means 12 to thus flow around and be in indirect heat exchange relationship with an internal coil 13 or other suitable fluid carrying passageway means. The latter is indicated diagrammatically as accommodating a fluid stream which enters the heat exchanger by way of inlet means 14 and is discharged as a heated fluid stream at 15. The resulting substantially cooled black body particles are continuously discharged at the lower end of the heat exchanger by way of an outlet line 16 and valve means 17 to enter a mixing section 20 and the transfer conduit 4 for recycle back to the solar heating tubes 1.

In a preferred operation as shown by the drawing, the particle carrying air or other gas stream will be transfered from the blower means 9 through a conduit means 18 and a control valve means 19 to the mixing zone 20 below conduit 16 whereby there may be the resulting re-entrainment of the particles with the carrying fluid and the transfer of the mixture by way of conduit 4 to the solar heating zone.

Normally there can be the mixing and the re-entrainment of the particles from line 16 into line 4 through the use of a typical Tee or a Y arrangement at 20; however, where deemed suitable, special venturi type mixing means or eductor means may well be utilized to effect the desired intermixing of the separated particles with the carrying fluid such that a well mixed, uniform entrainment of particles will result in the combined stream carrying to header means 3 and the solar heating tubes 1.

There is also indicated in the drawing that there may be the provision of a conduit 21 with valve means 22, branching from line 18 that will provide for the introduction of the controlled amount of aeration fluid into the lower end of the heat exchange section 12. In connection with dry particulates moving in a descending gravity flow, it may be of particular advantage to provide for some movement and turbulence of particles within the interior of the heat exchanger 12 such that there is enhanced contact between heated particles and the coil 13 (or whatever type of heat exchange surfaces may be utilized within heat exchanger means 12). Generally, it will be of advantage to use a portion of the particle carrying gas for the aeration operation; however, where deemed preferable in any particular operation, there may be the use of the separate introduction of aerating fluid by way of line 23 and valve 24 into line 21 and the lower portion of heat exchanger 12. For example, it may be desired to introduce another inert medium such as nitrogen, carbon dioxide, dry steam, etc., in lieu of a particular carrying fluid, for the desired turbulent movement within heat exchanger 12.

It is to be understood that the present drawing is diagrammatic and should not be considered limited in any way as to the configuration or particular nature of any one portion of the heating and heat recovery system. As heretofore noted, the particle separator may be other than the centrifugal type as indicated in the drawing, and the heat exchange design may comprise any one of several different forms and need not be limited to a downward flow of particles therethrough. Actually, with a fluidized movement of particles in a gaseous stream or with particles concentrated in a liquid carrying medium in a particle rich stream, there may be the upward or lateral flow of particles through a heat exchange device.

In still another aspect, there can be modifications in placement of a blower, or the use of additional blowers, as may be required in any particular system. For example, in the present drawing there has been merely the indication of one blower means, following the particle separator means, to provide for the movement of the carrying medium and the particles being entrained therewith.

I claim as my invention:

1. A method for effecting the recovery of solar heat which comprises:

a. passing a gaseous carrying stream with entrained black body particles to a heating zone for exposure to solar radiant energy,
   b. passing said stream with resulting heated particles from said heating zone to a particle separation zone and effecting a separation to provide a particle stream and a primarily particle free stream,
   c. passing the particle stream from the latter zone to a heat exchange zone and recovering heat therefrom,
   d. subsequently passing the resulting cooled particle stream to a mixing zone and therein combining it with the particle free stream obtained from said separation zone, and
   e. then recirculating the recombined particle containing stream to said heating zone for reexposure to the solar energy.

2. The method of claim 1 further characterized in that said gaseous carrying stream is air.

3. The method of claim 1 further characterized in that said particle separation zone is of a centrifugal type permitting the centrifugal separation of the heated particles from the carrying stream.

4. The method of claim 1 further characterized in that particles from the particle separation zone are passed in a descending gravity flow through said heat exchange zone.

5. The method of claim 4 still further characterized in that an aerating medium is introduced into the lower portion of said heat exchange zone to provide for movement and turbulence of particles within such zone to enhance contact thereof with heat exchange surfaces therein.

6. The method of claim 4 still further characterized in that a portion of the separated particle free stream is introduced to said heat exchange zone to effect movement and turbulence of particles in said zone to enhance contact with heat exchange surfaces therein.

7. The method of claim 1 further characterized in that resulting cooled particles from said heat exchange zone are withdrawn by gravity therefrom and pass into a standpipe means to be intermixed with the separated particle free stream from said separation zone at a mixing zone maintained below the outlet from said heat exchange zone and the resulting intermixed entrained particles are recycled back to the heating zone for reexposure to the solar radiant energy.

8. The method claim 1 further characterized in that said black body particles are of a carbonaceous nature.

9. The method of claim 1 further characterized in that said black body particles are of substantially uniform size and of a generally spherical form whereby they can move in a non-compacting manner.

* * * * *